United States Patent
Motomiya et al.

(10) Patent No.: US 8,006,109 B2
(45) Date of Patent: Aug. 23, 2011

(54) INFORMATION PROCESSING APPARATUS AND POWER SUPPLY CONTROL METHOD

(75) Inventors: Hirohito Motomiya, Higasihyamato (JP); Shizuo Morioka, Hanno (JP)

(73) Assignee: Kabuhsiki Kaisha Toshiba, Tokyo (JP)

( * ) Notice: Subject to any disclaimer, the term of this patent is extended or adjusted under 35 U.S.C. 154(b) by 292 days.

(21) Appl. No.: 12/246,077

(22) Filed: Oct. 6, 2008

(65) Prior Publication Data
US 2009/0150694 A1 Jun. 11, 2009

(30) Foreign Application Priority Data
Dec. 6, 2007 (JP) .................. 2007-316361

(51) Int. Cl.
*G06F 1/26* (2006.01)
*G05D 17/00* (2006.01)
(52) U.S. Cl. ........................ 713/320; 700/297
(58) Field of Classification Search .................. 713/320, 713/330; 700/297
See application file for complete search history.

(56) References Cited

U.S. PATENT DOCUMENTS

| | | | |
|---|---|---|---|
| 5,289,361 A | 2/1994 | Vinciarelli | |
| 6,415,359 B1 * | 7/2002 | Kimura et al. | 711/137 |
| 6,772,366 B2 * | 8/2004 | Nguyen et al. | 714/10 |
| 6,956,360 B2 | 10/2005 | Matsuura et al. | |
| 2003/0098679 A1 * | 5/2003 | Odaohhara | 323/284 |
| 2004/0133813 A1 * | 7/2004 | Burnham et al. | 713/300 |
| 2007/0150765 A1 * | 6/2007 | Ochiai | 713/300 |
| 2008/0313477 A1 * | 12/2008 | Numano | 713/321 |

FOREIGN PATENT DOCUMENTS

| | | |
|---|---|---|
| JP | 03-124232 | 5/1991 |
| JP | 10-327100 | 12/1998 |
| JP | 2001-169468 | 6/2001 |

OTHER PUBLICATIONS

Wei et al. A Dynamic Voltage Scaling Controller for Maximum Energy Saving Across Full Range of Load Conditions, IEEE, 2005.*
Usam et al., Automated Low-power Technique Exploiting Multiple Supply Voltages Applied to a Media Processor, IEEE, 1997.*
Nielsen et al., Low-Power Operation Using Self-Timed Circuits and Adaptive Scaling of the Supply Voltage, IEEE, 1994.*
Quan et al., Energy Efficient Scheduling for Real-Time Systems on Variable Voltage Processors, University of Notre Dame, Department of Computer Science & Engineering, 2001.*

* cited by examiner

*Primary Examiner* — Albert DeCady
*Assistant Examiner* — Darrin Dunn
(74) *Attorney, Agent, or Firm* — Knobbe, Martens, Olson & Bear LLP

(57) ABSTRACT

According to one embodiment, an information processing apparatus includes a housing, a power supply incorporated in the housing, a conversion unit which converts a voltage supplied from the power supply, a detection unit which detects a voltage supplied from the power supply, and a control unit which, when the voltage detected by the detection unit has become less than or equal to a specific threshold value, controls the power supply so as to lower not only a voltage output from the conversion unit by a specific percentage but also a voltage supplied to the detection unit by a specific percentage.

8 Claims, 6 Drawing Sheets

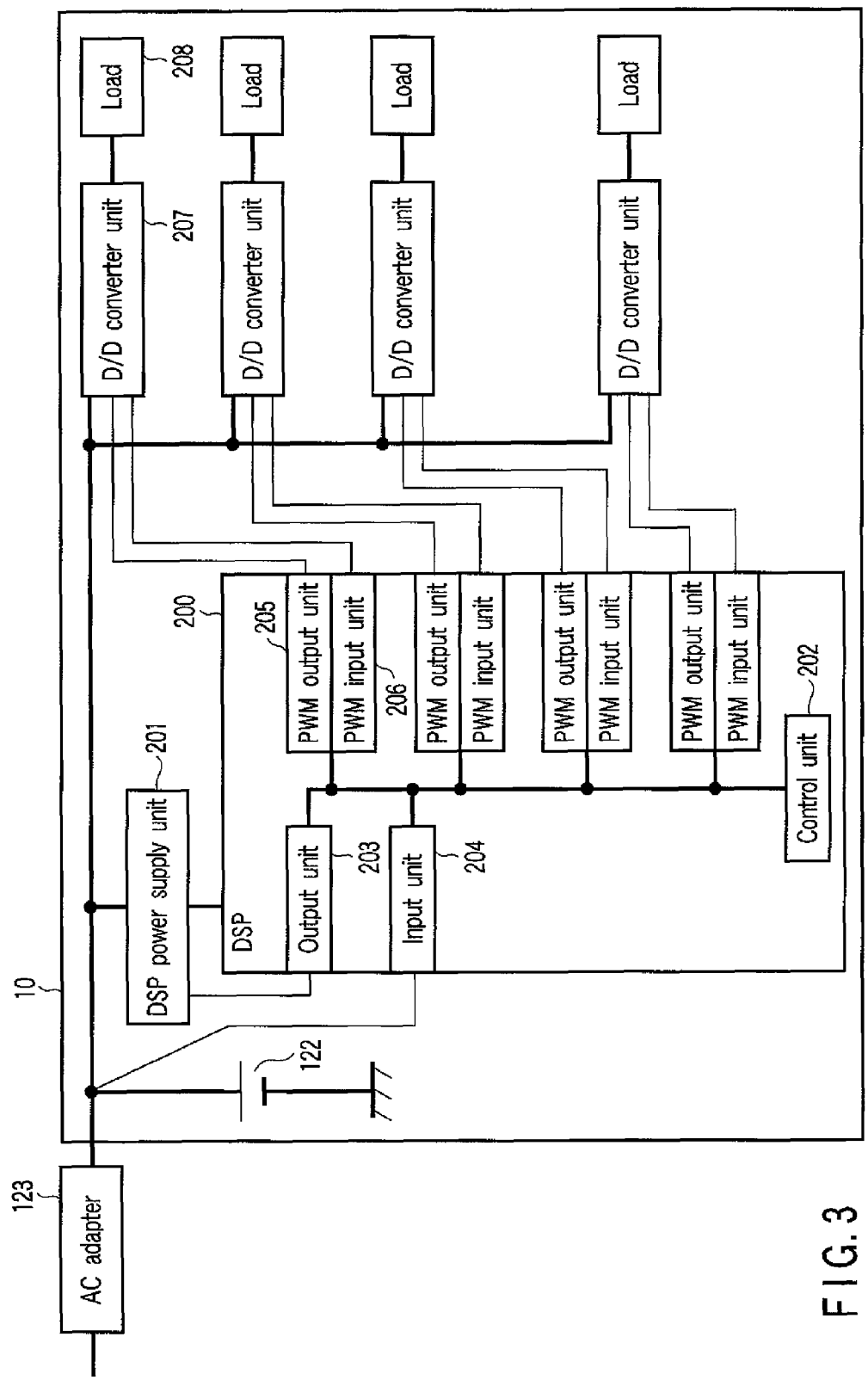
F I G. 3

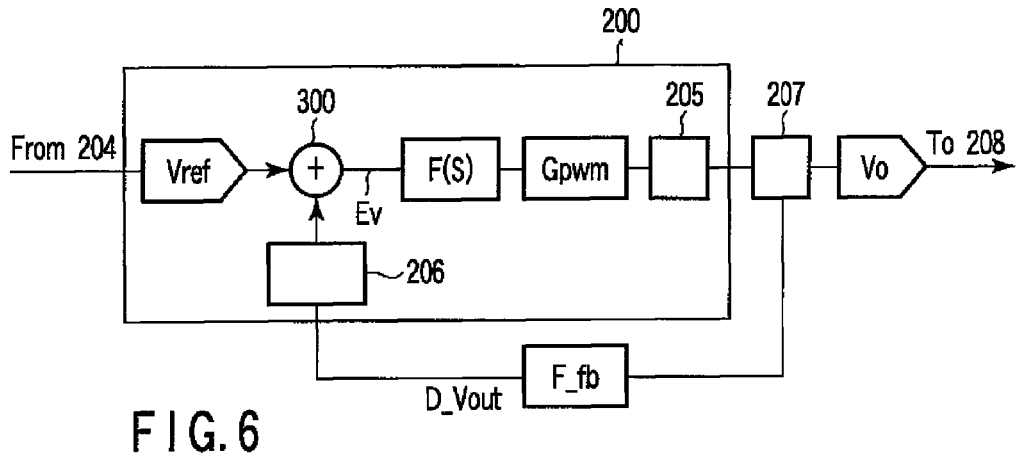
FIG. 6
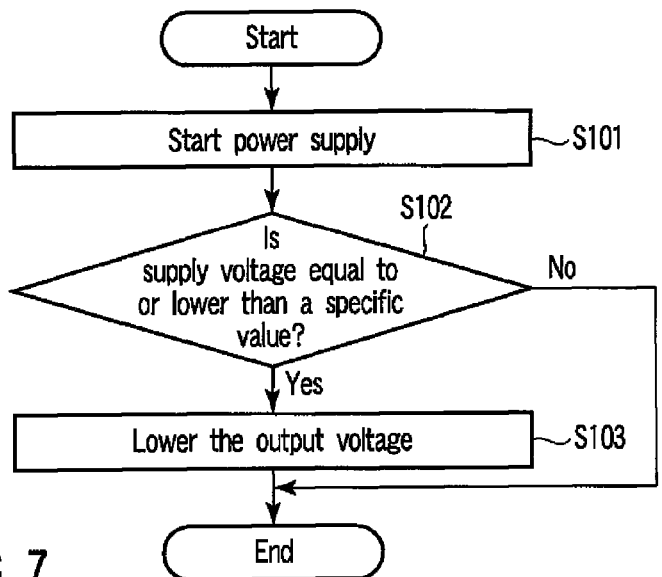
FIG. 7
| Input voltage value (V) | n |
|---|---|
| 13 or more and 15 or less | 1 |
| 10 or more and less than 13 | 0.8 |
FIG. 8

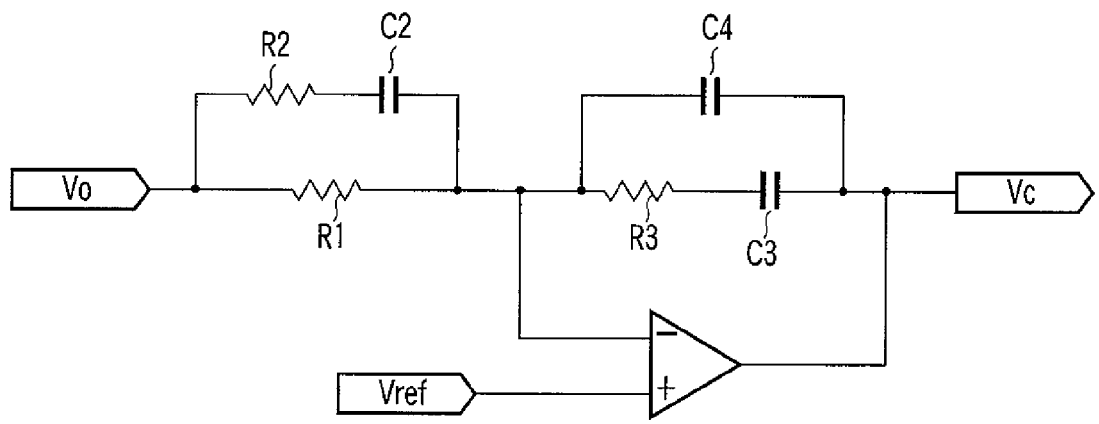
F I G. 9

INFORMATION PROCESSING APPARATUS AND POWER SUPPLY CONTROL METHOD

CROSS-REFERENCE TO RELATED APPLICATIONS

This application is based upon and claims the benefit of priority from Japanese Patent Application No. 2007-316361, filed Dec. 6, 2007, the entire contents of which are incorporated herein by reference.

BACKGROUND

1. Field

One embodiment of the present invention relates generally to a power supply control method, and more particularly to an information processing apparatus and a power supply control method which are capable of reducing power consumption.

2. Description of the Related Art

Generally, a system capable of operating from both a battery and an external power supply (e.g., AC power supply), when receiving power supply from the battery, lowers the output voltage of the DC-DC converter, thereby reducing the power consumption of the system. For example, Jpn. Pat. Appln. KOKAI Publication No. 3-124232 has disclosed the technique for achieving low power consumption.

However, while in the technique described in Jpn. Pat. Appln. KOKAI Publication No. 3-124232, the power consumption of the system is reduced by lowering the output voltage of the DC-DC converter, the supply voltage to the control unit that controls the DC-DC converter remains unchanged and therefore the electrical power saving of the control unit is not performed.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 3 is an exemplary block diagram of a power supply circuit and others of the information processing apparatus according to the embodiment;

FIG. 6 is an exemplary block diagram of a digital control function according to the embodiment;

FIG. 7 is an exemplary flowchart to help explain a power supply control method in the information processing apparatus of the embodiment;

FIG. 8 is an exemplary table that lists coefficients n corresponding to the input voltages to the information processing apparatus of the embodiment; and FIG. 9 is an exemplary circuit diagram of an analog filter corresponding to mathematical expression F(s) in the information processing apparatus of the embodiment.

DETAILED DESCRIPTION

Various embodiments according to the invention will be described hereinafter with reference to the accompanying drawings. In general, according to one embodiment of the invention, an information processing apparatus includes: a housing; a power supply incorporated in the housing; a conversion unit which converts a voltage supplied from the power supply; a detection unit which detects a voltage supplied from the power supply; and a control unit which, when the voltage detected by the detection unit has become less than or equal to a specific threshold value, controls the power supply so as to lower not only a voltage output from the conversion unit by a specific percentage but also a voltage supplied to the detection unit by a specific percentage.

Hereinafter, referring to the accompanying drawings, an embodiment of the invention will be explained.

First, referring to FIGS. 1 and 2, the configuration of an information processing apparatus according to an embodiment of the invention will be explained. The information processing apparatus is realized in the form of, for example, a notebook-size personal computer 10.

Figure 1:
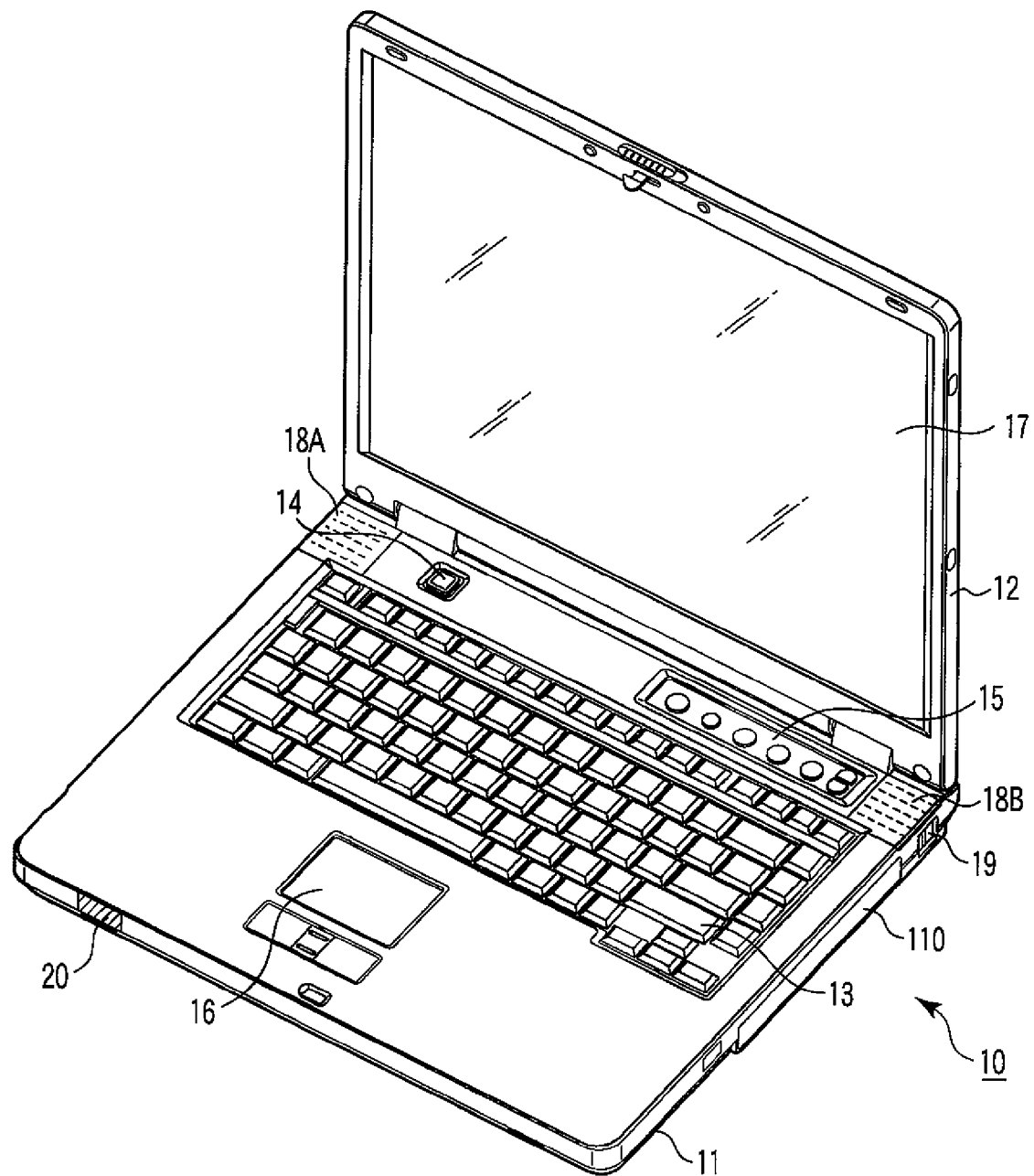
FIG. 1 schematically shows an example of the configuration of an information processing apparatus according to an embodiment of the invention.

FIG. 1 is a perspective view of the notebook-size personal computer 10, with its display unit being opened. The computer 10 is composed of a computer body 11 and a display unit 12. A display device composed of a thin-film-transistor liquid crystal display (TFT-LCD) 17 is incorporated in the display unit 12. The display screen of the LCD 17 is located almost in the center of the display unit 12.

The display unit 12 is provided on the computer body 11 in such a manner that it can turn freely between an open position and a closed position. The computer body 11 has a thin boxlike housing. At its top face, there are provided a keyboard 13, a power button for turning on or off the computer 10, an input operation panel 15, a touch pad 16, speakers 18A, 18B, a DVD drive 110, an infrared receiver unit 20, and others.

The input operation panel 15, which is an input unit for inputting an event corresponding to a button pressed by the user, includes a plurality of buttons for activating a plurality of functions.

Next, referring to FIG. 2, the system configuration of the computer 12 will be explained.

Figure 2:
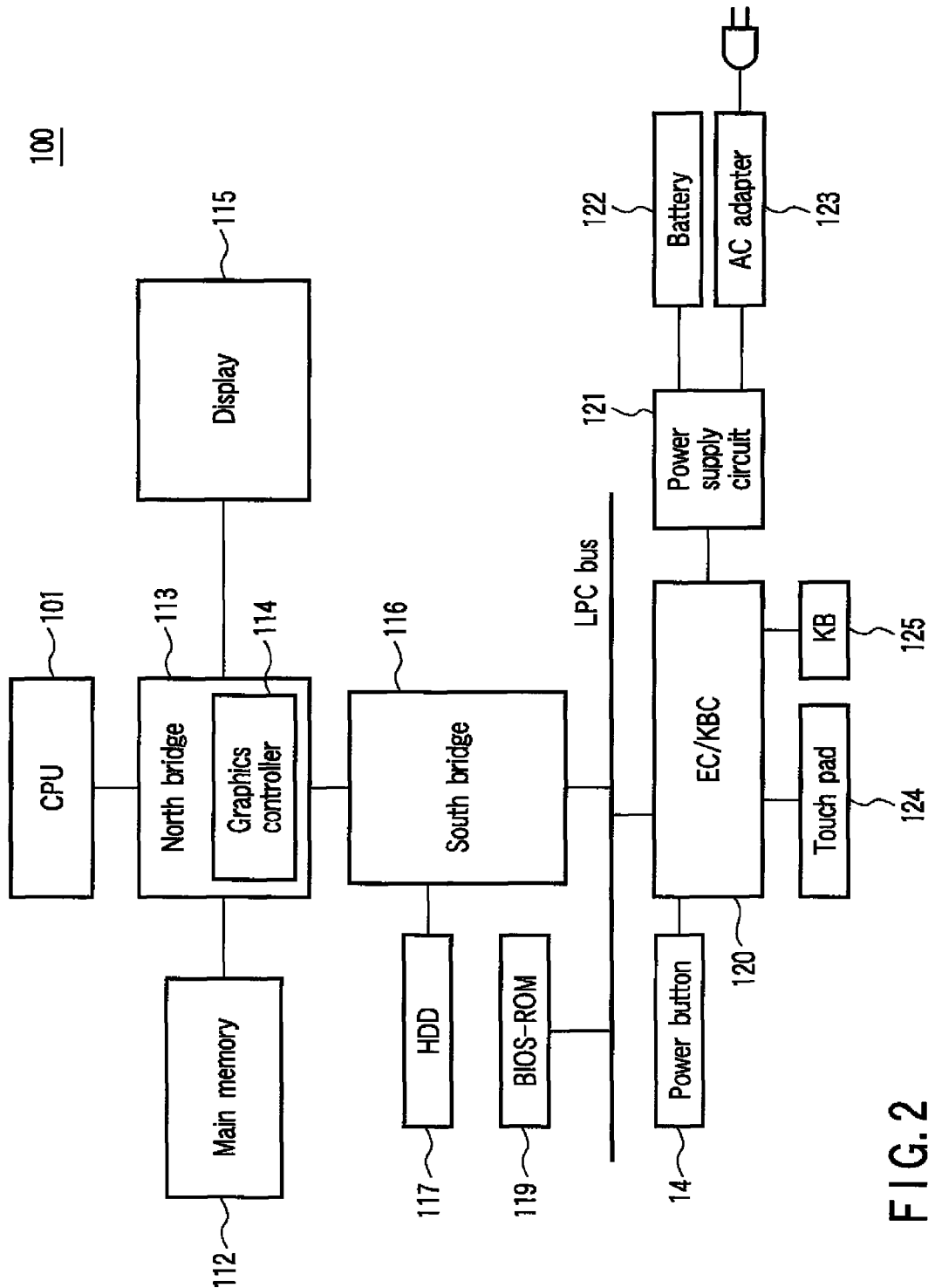
FIG. 2 is an exemplary block diagram of the information processing apparatus according to the embodiment.

As shown in FIG. 2, the computer 10 includes a CPU 101, a north bridge 113, a main memory 112, a south bridge 116, a graphics controller 114, a BIOS-ROM 119, a hard disk drive (HDD) 117, an embedded controller/keyboard controller IC (EC/KBC) 120, a power button 14, speakers 18A, 18B, a power supply circuit 121, a battery 122, and an AC adapter 123.

The power supply circuit 121, which includes a digital signal processor (DSP) described later, performs power supply control to reduce the power consumption of the computer 10.

The CPU 101, which is a processor for controlling the operation of the computer 10, executes an operating system loaded from the hard disk drive (HDD) 117 into the main memory 112 and a control application 30 for controlling the reproduction of sound from the computer 10. The CPU 101 further executes a Basic Input Output System (BIOS) stored in the BIOS-ROM 119. The BIOS is a program for performing hardware control.

The north bridge 113 is a bridge device for connecting a local bus of the CPU 101 and the south bridge 116. The north bridge 113 includes a memory controller for providing access control of the main memory 112. The north bridge 113 has the function of communicating with a GPU 105 via a serial bus conforming to the PCI Express standard.

The GPU 105 is a display controller for controlling the LCD 17 used as a display monitor of the computer 10. A display signal generated by the GPU 105 is sent to the LCD 17.

The south bridge 116 controls the devices on a low-pin-count (LPC) bus and the devices on a Peripheral Component Interconnect (PCI) bus. The south bridge 116 includes an Integrated Drive Electronics (IDE) controller for controlling the HDD 117.

The embedded controller/keyboard controller IC (EC/KBC) 120 is a one-chip microcomputer into which an embedded controller for power management and a keyboard controller for controlling the keyboard (KB) 13 and touch pad 16 are integrated. The embedded controller/keyboard controller IC (EC/KBC) 120 has the function of turning on or off the computer 10 according to the operation of the power button 14 by the user.

Next, the functional configuration of the power supply circuit including a DSP will be explained with reference to a block diagram in FIG. 3.

The power supply circuit is composed of an AC adapter 123 and a battery 122 which constitute a power supply unit, a DSP 200 serving as an output control DSP, a DSP power supply unit 201, and D/D converter units 207. A load 208 connected to each of the D/D converter units 207 is a device or the like which consumes electric power, such as the CPU 101 or HDD 117.

The battery 122 is incorporated in the computer 10. Even when there is no power supply from the AC adapter 123, the computer 10 can be driven by the battery 122.

The DSP power supply unit 201 converts the voltage from the AC adapter 123 or battery 122 into a supply voltage to the DSP 200. The DSP power supply unit 201 further has the function of varying the supply voltage to the DSP 200 according to a signal from the DSP 200.

The DSP 200 includes PWM output unit 205 and PWM input unit 206 which input/output a pulse width modulation (PWM) signal according to data from a control unit 202 of the DSP 200, an input unit 204 which converts an analog signal into digital data, and an output unit 203 which converts the data from the control unit 202 into an analog signal and outputs the signal.

The PWM signal from the PWM output unit 205 is input to the D/D converter unit 207.

Figure 4:
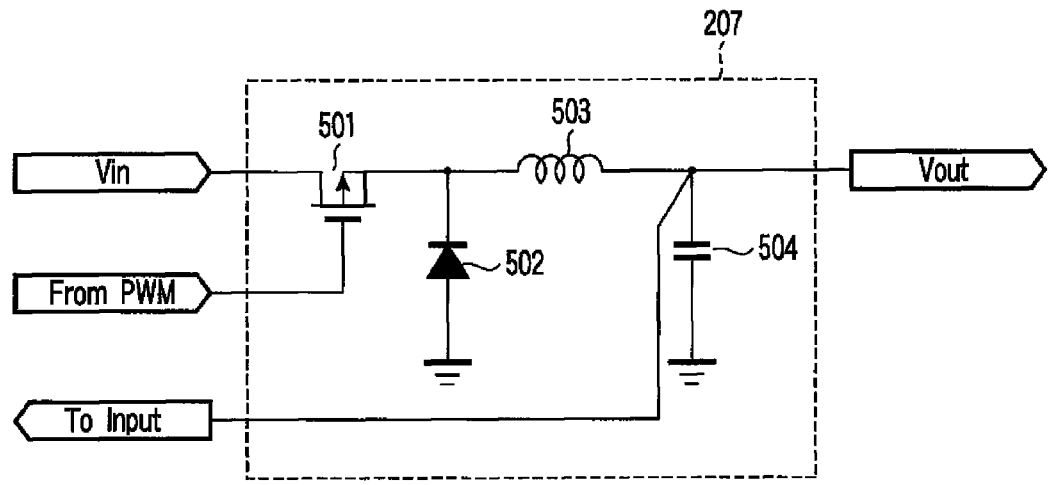
FIG. 4 is an exemplary circuit diagram of a D/D converter of the information processing apparatus according to the embodiment.

As shown in FIG. 4, the D/D converter unit 207 is composed of a switching element 501, a rectifying device 502, a coil 503, and a capacitor 504. The PWM output unit 205 inputs to the D/D converter unit 207 a signal (PWM signal) which turns on and off the switching element 501 so as to convert the voltage applied from the AC adapter 123 or battery 122 into a voltage needed by the load 208 (see FIG. 3). The coil 503 and capacitor 504 function as an LC filter and smooth the voltage turned on and off by the switching element 501.

In FIG. 3, the voltage output from the D/D converter unit 207 is converted from an analog level to digital data at the DSP 200. The converted digital data is sent to the control unit 202. The control unit 202 calculates the on duty of the PWM signal on the basis of the digitally-converted output voltage of the D/D converter 207 so that the output voltage may become a reference value (Vref_207) and sends the result to the PWM output unit 205.

The reference value (Vref_207), which is held in the control unit 202, is set for each of the D/D converter units.

The voltage of a driving power source of the computer 10 is input to the input unit 204. The analog level of the voltage is converted into a digital data at the input unit 204, which sends the result of the conversion to the control unit 202. On the basis of the digital data received, the control unit 202 can determine the voltage of the driving power source of the computer 10.

The output unit 203, which has the function of converting the digital data from the control unit 202 into an analog level, outputs the analog level to the DSP power supply unit 201.

Figure 5:
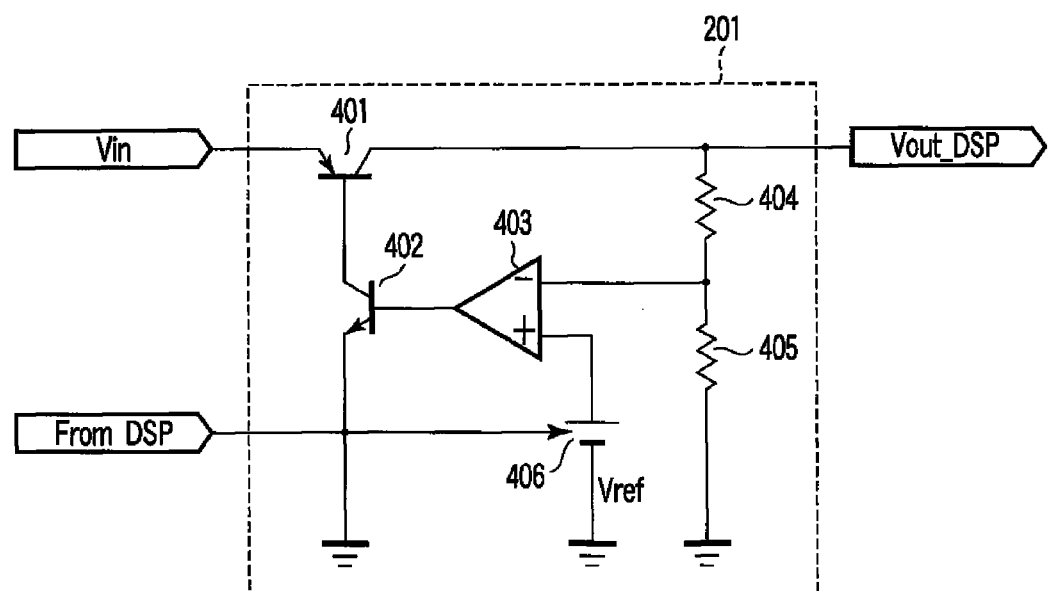
FIG. 5 is an exemplary circuit diagram of a DSP power supply unit of the information processing apparatus according to the embodiment.

As shown in FIG. 5, in the DSP power supply unit 201, transistors 401 and 402 are controlled by an output signal from an error comparator 403 in such a manner that a voltage set at a reference voltage 406 becomes equal to the voltage obtained by dividing an output voltage on the basis of resistances 405 and 405. The reference voltage 406 can be varied according to a signal from the output unit 203.

The output voltage V_ADP of the AC adapter 123 is set higher than the voltage V_BAT of the battery 122 to make it possible to charge the battery 122. Therefore, even if the driving power supply of the computer 10 changes from the AC adapter 123 to the battery 122 or vice versa, the DSP 200 inputs a suitable PWM signal to each of the D/D converter units 207 so that the output voltage to each load may be constant.

At the same time, the DSP 200 inputs a suitable PWM signal to each D/D converter unit 207 so that the output voltage may be constant even if the output current to the load 208 changes.

Many of the circuits in the computer 100 which function as the loads 208 of the D/D converter units 207 are CMOS devices which operate in synchronization with various clock signals. The power consumption of each of the devices is expressed as $P = CV^2 f$.

Here, C is a capacitance in each of the devices, f is the frequency of the synchronizing signal of the device, and V is the operating voltage of the device. When C and f of each device which constitute a load 208 are constant, the power consumption P of the device is proportional the square of the operating voltage V.

In the embodiment, each of the outputs is controlled digitally. FIG. 6 is a block diagram of a digital control function of the embodiment.

In the control unit 202 (see FIG. 3) of the DSP 200, a computing unit 300 calculates the difference (Ev) between an output voltage reference value (Vref) obtained from the input unit 204 and digital data (D_Vout) of the output voltage obtained from the PWM input unit 206. The calculated difference (Ev) is multiplied by F(s) and Gpwm using equation (1). The result (Dpwm) is supplied to the PWM output unit 205.

$$Dpw = Gpwm \times F(s) \times Ev \qquad \text{equation (1)}$$

Here Ev=Vref−(Vo*F_fb) where F_fb is the gain of the output voltage Vo.

$$F(s) = \frac{R1 + R2}{s \times R1 \times C4 \times R2} \times \frac{\left(s + \frac{1}{C3 \times R3}\right) \times \left(s + \frac{1}{C2 \times (R1 + R2)}\right)}{\left(s + \frac{C3 + C4}{C3 \times C4 \times R3}\right) \times \left(s + \frac{1}{C2 \times R2}\right)}$$

F(s) is an example. In addition, F(s) is the mathematization of an analog filter shown in FIG. 9.

The functions of F(s) are as follows:
1. A stabilized voltage can be obtained by averaging the output voltages.
2. Noise and high-frequency components are eliminated.
3. Phase retardation caused by an LC filter composed of the coil 503 and capacitor 504 is corrected, improving the stability of the power supply.

Here, Gpwm is determined as follows. In a system driven by an AC adapter 123 or a battery 122 like a notebook-size personal computer (computer 10), the input range of the driving voltage is great. For example, the driving voltage is in the range of 8V to 15V. Therefore, the gain at the time when the input voltage is high (e.g., the system is driven by the AC adapter 123) is used as a reference value (Gpwm). When the input voltage drops (e.g., when the system is driven by the battery 122), a calculation is done using equation (2):

$$Gpwm = Gpwm \times n \qquad \text{equation (2)}$$

where coefficient n is 1 or less.

The value of n is stored in the form of, for example, a table in the control unit 202 of the DSP 200 as shown in FIG. 8. When the input voltage is high (e.g., when the system is driven by the AC adapter 123 at, for example, 13V or more and 15V or less), n is set at 1 (n=1) and the input voltage is not lowered. In contrast, when the input voltage has dropped (e.g., when the system is driven by the battery 122 at, for example, 10V or more and 13V or less), n is set at 0.8 (n=0.8) and the input voltage is not lowered by 20%.

Next, a power supply control method used in the information processing apparatus according to the embodiment will be explained with reference to a flowchart in FIG. 7.

As a result of the power switch 14 being pressed, the supply to electric power to the computer 10 is started (Block S101).

The DSP 200 of the computer 10 monitors the voltage supplied from the power supply. When the DSP 200 has detected that the voltage has dropped below a specific level (a threshold value) of a preset voltage as a result of the driving power supply of the computer 10 being switched to the battery 122 (YES in Block S102), the DSP 200 calculates a value given to the PWM output using equation (1) and equation (2), performing control to lower the output voltage. Specifically, the control unit 202 of the DSP 200 reads a controlled value of the output voltage previously set in the control unit 202 and lowers the output voltage of each D/D converter unit 207 by a specific percentage, for example, 106. At the same time, according to the signal from the output unit 203, the DSP 200 lowers the output voltage from the DSP power supply unit 201 by a specific percentage, for example, 10% (Block S103).

As described above, when the driving power supply source has been changed from the AC adapter 123 to the battery 122, the operating voltages of each load 208 (device) and DSP 200 are lowered by 10%, which enables the power consumption of the computer 10 to be reduced by about 20%.

The reduction of the power consumption makes it possible to lengthen the driving time when the computer 10 is driven by the battery and save electric power.

The invention is not limited to the above embodiment and may be embodied in still other ways by modifying the component elements without departing from the spirit or essential character thereof.

In addition, various inventions may be formed by combining suitably a plurality of component elements disclosed in the embodiment. For example, some components may be removed from all of the component elements constituting the embodiment. Furthermore, component elements used in two or more embodiments may be combined suitably.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
a housing;
an internal power supply incorporated in the housing and configured to supply driving power to the information processing apparatus;
an external power supply configured to supply power to the internal power supply and supply driving power to the information processing apparatus;
a controller configured to detect which one of the internal power supply and the external power supply supplies the driving power to the information processing apparatus;
a plurality of converters connected to the controller in correspondence to a plurality of loads that consume power; and
a power supply module for the controller configured to convert a voltage supplied from either the internal power supply or the external power supply into a voltage to be supplied to the controller in accordance with a signal supplied from the controller,
wherein
the controller lowers an output voltage which the controller outputs to the converters by a first predetermined percentage and supplies the signal to the power supply module for the controller in order to lower a voltage which the power supply module for the controller supplies to the controller by a second predetermined percentage when the supply of power from the external power supply to the information processing apparatus stops, and the controller detects that the driving power of the information processing apparatus has switched from the external power supply to the internal power supply.

2. The information processing apparatus of claim 1, wherein the controller is configured to provide digital control of the voltage supplied from either the internal power supply or the external power supply.

3. The information processing apparatus of claim 1, wherein a target voltage value to which the voltage is lowered is stored in advance.

4. The information processing apparatus of claim 3, wherein the controller lowers the voltage by a predetermined percentage in accordance with a difference between the voltage value supplied from the internal power supply and the target voltage value.

5. A power supply control method used in an information processing apparatus comprising a housing, an internal power supply incorporated in the housing and configured to supply driving power to the information processing apparatus, an external power supply configured to supply power to the internal power supply and supply driving power to the information processing apparatus, a controller configured to detect which one of the internal power supply and the external power supply supplies the driving power to the information processing apparatus, a plurality of converters connected to the controller in correspondence to a plurality of loads that consume power, and a power supply module for the controller configured to convert a voltage supplied from either the internal power supply or the external power supply into a voltage to be supplied to the controller in accordance with a signal supplied from the controller, the power supply control method comprising:

the controller lowering an output voltage which the controller outputs to the converters by a first predetermined percentage and supplying the signal to the power supply module for the controller in order to lower a voltage which the power supply module for the controller supplies to the controller by a second predetermined percentage when the supply of power from the external power supply to the information processing apparatus stops, and the controller detects that the driving power of the information processing apparatus has switched from the external power supply to the internal power supply.

6. The power supply control method of claim 5, wherein the controller is configured to provide digital control of the voltage supplied from either the internal power supply or the external power supply.

7. The power supply control method of claim 5, wherein a target voltage value to which the voltage is lowered is stored in advance.

8. The power supply control method of claim 7, wherein the controller lowers the voltage by a predetermined percentage in accordance with a difference between the voltage value supplied from the internal power supply and the target voltage value.

* * * * *